Figure 1:
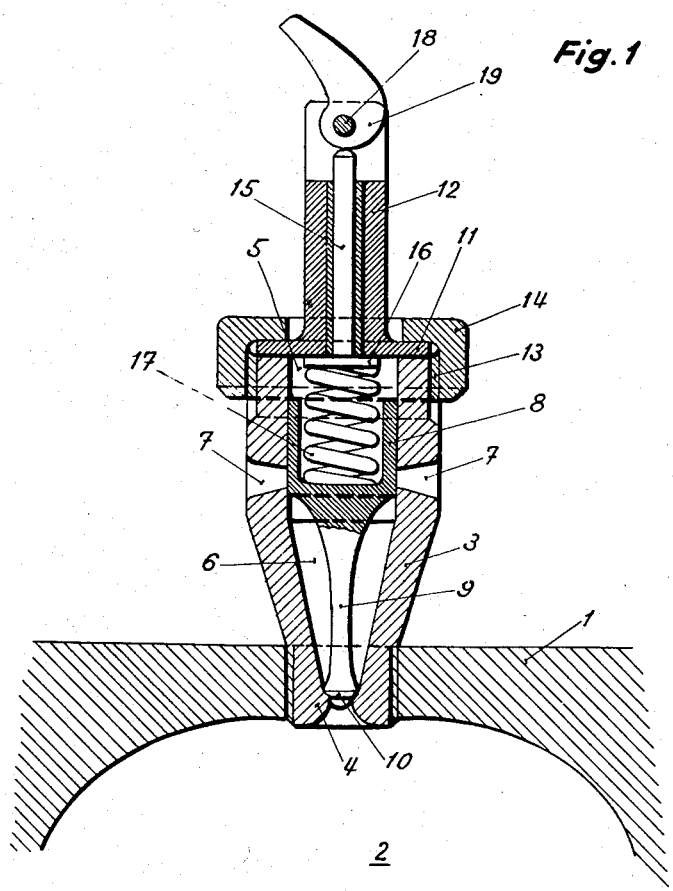

Jan. 17, 1961 R. HALLER 2,968,295
INTERNAL COMBUSTION ENGINE BRAKE
Filed March 1, 1957

INVENTOR:
RICHARD HALLER

By Toulmin & Toulmin

Attorneys

United States Patent Office 2,968,295
Patented Jan. 17, 1961

2,968,295

INTERNAL COMBUSTION ENGINE BRAKE

Richard Haller, Brauerstrasse 51, Zurich, Switzerland

Filed Mar. 1, 1957, Ser. No. 643,412

Claims priority, application Switzerland Mar. 2, 1956

5 Claims. (Cl. 123—97)

My present invention relates to improvements in internal combustion engine brakes as used, in particular, in motor cars.

When the fuel supply in a motor-car engine is turned off, the engine stops after a few revolutions since energy has to be expended for overcoming the friction and for the compression strokes whereby heat is generated, and such energy is no longer supplied to the engine after combustion has stopped. This phenomenon is utilized in motor cars for braking by letting the motor be turned by the rolling car when the fuel supply has been cut out. This motor braking action may be intensified further in the case of four-cycle motors, by incorporating an exhaust brake, since the exhaust strokes against the closed exhaust require additional work to be expended. In the case of two-cycle motors, however, which operate without exhaust stroke, such an exhaust brake cannot be used. Motor cars equipped with two-cycle engines thus cannot be braked sufficiently by mere engine idling, particularly not when riding downhill for any extended time.

All the piston engines, however, operate with compression strokes by which the air or the gas mixture is compressed in a closed combustion chamber. The driving power transmitted by the rolling car to the motor of which the fuel supply has been stopped, is for the greatest part absorbed by the compression strokes. When the valves are closed, power of course is again delivered to the pistons in the expansion strokes following the compression strokes, so that only that part of the driving energy taken up by the idling motor is effective in braking which is converted into heat during the compression strokes and which is removed in the form of heat.

It has been proposed to intensify the braking action of the motor driven by the rolling car by letting the compressed charge escape at the end of the compression stroke or shortly before, in order to prevent this compressed charge from reacting on the piston any further or from reacting further to the full extent, and to make the piston work also during the expansion stroke by virtue of the atmospheric pressure acting against its bottom. To such end, auxiliary control means are known for the exhaust of the compressed charge, which means become operative in the upper dead centers of the pistons. Such auxiliary means are very efficient but require a great construction expense. If the existing exhaust valves are used for such purpose, the camshaft controlling these valves has to be adjustable or movable. If, however, separate valves are provided for the exhaust of the compressed charge, these valves have to be actuated by a special camshaft in acordance with the engine cycle and, if necessary, tappets and rocker arms have to be employed. In view of the very crowded conditions on and about the motor, the mounting of such an auxiliary control device is difficult in most cases, and in an existing motor such a device in most cases cannot be subsequently mounted at all.

Further, valves have been proposed for this purpose which are held continuously closed when the motor is running, and which at a predetermined degree of compression are opened against the action of a spring. The increased braking action of the car-driven motor obtainable with such spring-loaded valves is, however, very limited, as these valves are closed again at once when the pressure in the combustion chamber drops below the value at which they begin to open. The compressed charge, therefore, is not entirely expanded. The weaker the springs which hold these valves closed, the lesser the braking action attained by the compression stroke; and the stronger these springs, the smaller the expansion of the compressed charge and the greater the driving action of the latter in the expansion stroke. However, a motor-braking device comprising such valves is known, in which the latter are controlled by the pressure of an injection pump. Such motor brakes, which of course only can be used in motors involving injection pumps, require, however, a substantial structural expense, and the requisite pressure lines as well as their closure element are susceptible to trouble. All of these disadvantages may be eliminated by the present invention.

The subject matter of the present invention is a motor brake for internal combustion engines, in particular engines of motor cars, in which each cylinder is provided with a brake valve which is continuously held closed when the motor is running. This motor brake is characterized in that each brake valve comprises a valve cone which through spring action is depressed on a valve seat and which is subjected to the pressure existing in the cylinder combustion chamber, and an element connected to said valve cone which has a working face or effective area several times larger than that of the cone, said element being subjected to the pressure of the cylinder charge escaping between valve cone and valve seat. This brake valve is so arranged that when the motor is used for braking and the valve cone is raised from its seat under a predetermined pressure in the cylinder combustion chamber, the reduced pressure of the escaping charge acting on said element is capable, thanks to its larger working face, to hold this element in a position in which it in turn holds the valve cone raised from its seat until the pressure in the cylinder combustion chamber has dropped far below the value required for raising the valve cone from its seat.

This valve in internal combustion engines used as brake, is automatically opened at a definite and selectable value of compression but does not close again at once when the pressure falls below said value. In the contrary, said valve is continuously held open until a much lower pressure is reached, since, when the valve is open, the pressure does no longer act on the valve cone but on the face of said element, which is several times larger. The braking action of the motor driven by the rolling car thereby may be quite substantially increased.

Brake valves of this type, which may be installed not only in newly constructed motors but also in existing motors, are suited for all types of piston engines, in particular also for two-cycle engines.

One embodiment of a brake valve in accordance with the invention, of a motor brake for internal combustion engines, in particular for motor cars, is schematically shown in the drawing.

Numeral 1 designates a cylinder head of an internal combustion engine which is not further shown and of which 2 is the combustion chamber. Into the latter opens a threaded bore of cylinder head 1, into which is screwed the lower threaded end of a valve housing 3. The latter is upwardly enlarged and comprises in its lowermost portion and close to its lower mouth, a valve seat 4, and in its upper portion a cylindrical space 5 of substantially greater diameter. An upwardly conically enlarged chamber 6 leads from valve seat 4 to the cylindrical space 5. On the lower end of the latter are provided outlet ports 7 in the wall of valve housing 3. In space 5 is guided a hollow piston 8 which is closed at the bottom and on the underside of which is provided an integral valve spindle 9 of which the lower end forms a valve cone 10. Space 5 is closed on top by a flange 11 of a guide member 12, which flange is held in contact with valve housing 3 by a cap nut 14 screwed on threads 13 to the upper end of valve housing 3. In guide member 12 is guided a tappet 15 of which the lower end carries a spring plate 16 disposed in space 5. Between spring plate 16 and piston 8 is disposed a compression spring 17 which depresses piston 8 and thus valve cone 10 on to its seat 4. To the upper portion of guide member 12 and on a pin 18 is pivoted an eccentric 19 which acts on the upper end of tappet 15. The latter is adjustable by a linkage or Bowden cable (not shown), if desired also pneumatically or hydraulically, from the driver's seat of the car. Tappet 15 also may be actuated by a pressure agent while dispensing with eccentric 19.

In the normal operation of the car, i.e. when the motor is running, eccentric 19 is in a position in which it depresses tappet 15 in guide member 12. Compression spring 17 thereby is so stressed that it is capable to hold piston 8 with valve cone 10 in the closing position also against the highest pressure arising in combustion chamber 2. When the motor is to be used for braking the car, eccentric 19 by the means mentioned is set so that it permits tappet 15 to move upwardly in guide member 12 to assume the position shown in the drawing. Thereby compression spring 17 is relieved to such an extent that it lets move back piston 8 on valve cone 10 at a predetermined pressure of the charge compressed in combustion space 2, which pressure is adjustable by a corresponding choice of the force and initial tension of spring 17. When the pressure in space 2 in the course of the compression stroke reaches the value contemplated, valve cone 10 is raised from seat 4. Piston 8 thereby at first still closes the outlet ports 7 so that the full pressure in space 2 acts on piston 8 which thus is pushed upwardly. The bottom rim of the latter then clears the outlet ports 7, and the charge compressed in chamber 2 escapes through space 6 and the ports 7. Since, however, the escape of the charge is throttled to a certain extent, an excess pressure remains in chamber 6 which, however, is greatly reduced. Since this reduced excess pressure acts on the entire bottom of piston 8 which is several times larger than the effective area of valve seat 4, it suffices to hold piston 8 and thus valve cone 10 in the raised position even when the pressure in chamber 2 drops below the value required for raising valve cone 10 from its seat 4. When the pressure of the escaping charge which acts on piston 8 drops, the latter advances under the action of spring 17 and gradually closes again the outlet ports 7 so that the outflow of the charge is progressively throttled, thereby causing a further delay in the complete closing of valve 4, 10. Once open, the latter thus is continuously held open until the pressure in chamber 2 has dropped far below the value required for opening this valve. By a suitable choice of the strength and initial tension of spring 17, it becomes possible to have valve 4, 10 open only shortly before the maximum compression is reached, whereupon this valve stays still open until the pressure in chamber 2 has dropped to a small fraction which even at very high compression may amount to much less than one atmosphere gauge. The braking action of internal combustion engines thereby is substantially raised in a very simple and suitable manner.

In place of piston 8 one may provide a membrane for example, in the center of which is inserted the upper end of the valve spindle which carries the valve cone. This membrane may be acted on on its rear side by a spring of which the initial tension may be varied from the driver's seat of the car. Again, this membrane may be subjected to the action of a pressure fluid of which the pressure may be varied from the driver's seat of the car in order to hold the brake valve continuously closed when the motor is running.

I claim:
1. A valve device comprising, in combination, a hollow valve casing formed with inlet and outlet means; a valve member having a closure portion and a fluid pressure responsive control portion the effective area of which is greater than that of said closure portion, said valve member being arranged in said valve casing for movement between a closed position wherein said closure portion closes said inlet means and an open position wherein said closure portion is spaced from said inlet means; biasing means in the form of compression spring means continuously urging said valve member to its closed position, whereby when said valve member is in its closed position, a gaseous fluid medium exerting upon said closure portion a pressure which is greater than a predetermined pressure, will move said valve member to its open position against the action of said biasing means and will flow into said valve casing and act upon said fluid pressure responsive control portion, thereby maintaining said valve member in its open position against the action of said biasing means until the pressure of said fluid medium falls to a value lower than said predetermined minimum pressure which was required initially to move said valve member to its open position; and quick-acting adjusting means associated with said biasing means for adjusting the force with which said valve member is urged to its closed position, said quick-acting adjusting means being movable between at least two positions in one of which said biasing means exerts a sufficiently great force to maintain said valve member closed under maximum pressure conditions to which said closure portion of said valve member is exposed and in the other of which positions said biasing means exerts a force which permits said valve member to be moved to its open position upon the attainment of a preselected minimum pressure; said valve casing being elongated with the interior of said valve casing being cylindrical throughout a portion of its length and tapering toward an apex throughout the remainder of its length, wherein said inlet means is located at said apex, and wherein said closure portion of said valve member is arranged in said tapering portion and said fluid pressure responsive control portion is arranged in said cylindrical portion.

2. A valve device as defined in claim 1 wherein said control portion of said valve member is in the form of a piston.

3. A valve device as defined in claim 2 wherein said outlet means emanate radially from said cylindrical interior portion and are covered and uncovered by said piston.

4. For use with an internal combustion engine having at least one cylinder, a braking device comprising, in combination, a hollow valve casing formed with inlet and outlet means, the former being adapted to communicate with a cylinder of the internal combustion engine; a valve member having a closure portion and a fluid pressure responsive control portion the effective area of which is greater than that of said closure portion, said valve member being arranged in said valve casing for movement between a closed position wherein said closure portion closes said inlet means and an open position wherein said closure portion is spaced from said inlet means; biasing means continuously urging said valve member to its closed position, whereby when said valve member is in its closed position and the gaseous fluid medium in the cylinder of the engine with which said inlet means is in communication exerts upon said closure portion a pressure which is greater than a predetermined minimum pressure, said valve member will be moved to its open position against the action of said biasing means so that the fluid medium will flow into said valve casing and act upon said fluid pressure responsive control portion, thereby maintaining said valve member in its open position against the action of said biasing means until the pressure of the fluid medium falls to a value lower than said predetermined minimum pressure which was required initially to move said valve member to its open position; and quick-acting adjusting means associated with said biasing means for adjusting the force with which said valve member is urged to its closed position, said quick-acting adjusting means being movable between at least two positions in one of which said biasing means exerts a sufficiently great force to maintain said valve member closed under maximum pressure conditions attainable in said cylinder and in the other of which positions said biasing means exerts a force which permits said valve member to be moved to its open position upon the attainment of a pre-selected minimum pressure in said cylinder.

5. An arrangement of the character described, comprising, in combination, an internal combustion engine having at least one cylinder; a hollow valve casing formed with inlet and outlet means, the former being in communication with said cylinder; a valve member having a closure portion and a fluid pressure responsive control portion the effective area of which is greater than that of said closure portion, said valve member being arranged in said valve casing for movement between a closed position wherein said closure portion closes said inlet means and an open position wherein said closure portion is spaced from said inlet means; biasing means continuously urging said valve member to its closed position, whereby when said valve member is in its closed position and the gaseous fluid medium in said cylinder exerts upon said closure portion a pressure which is greater than a predetermined minimum pressure, said valve member will be moved to its open position against the action of said biasing means so that the fluid medium will flow into said valve casing and act upon said fluid pressure responsive control portion, thereby maintaining said valve member in its open position against the action of said biasing means until the pressure of the fluid medium falls to a value lower than said predetermined minimum pressure which was required initially to move said valve member to its open position; and quick-acting adjusting means associated with said biasing means for adjusting the force with which said valve member is urged to its closed position, said quick-acting adjusting means being movable between at least two positions in one of which said biasing means exerts a sufficiently great force to maintain said valve member closed under maximum pressure conditions attainable in said cylinder and in the other of which positions said biasing means exerts a force which permits said valve member to be moved to its open position upon the attainment of a pre-selected minimum pressure in said cylinder.

References Cited in the file of this patent

UNITED STATES PATENTS

| | | |
|---|---|---|
| 1,161,417 | Schwerdtfeger | Nov. 23, 1915 |
| 1,196,862 | Hayes | Sept. 5, 1916 |
| 1,411,887 | Hulsmann | Apr. 4, 1922 |
| 1,518,799 | Krutina | Dec. 9, 1924 |
| 2,162,898 | Rotter | June 20, 1939 |
| 2,355,150 | De Simone | Aug. 8, 1944 |
| 2,594,626 | Earle | Apr. 29, 1952 |
| 2,778,349 | Thommen | Jan. 22, 1957 |
| 2,839,076 | Mueller | June 17, 1958 |

FOREIGN PATENTS

| | | |
|---|---|---|
| 21,690 | Great Britain | Oct. 5, 1901 |
| 655,355 | Great Britain | July 18, 1951 |
| 394,392 | France | Jan. 21, 1909 |
| 339,856 | Germany | Jan. 27, 1920 |
| 4,774 | Australia | Nov. 22, 1931 |
| 115,870 | Switzerland | July 18, 1925 |